Patented Aug. 24, 1943

2,327,564

UNITED STATES PATENT OFFICE 2,327,564

ANTHELMINTIC COMPOSITION

Robert P. Scherer, Detroit, Mich.

No Drawing. Application May 24, 1941,
Serial No. 395,003

6 Claims. (Cl. 167—53)

This invention relates to material intended for capsulation and particularly to a novel process of making the same and to a novel capsule product derived thereby.

Heretofore in the manufacture of capsules considerable difficulty has been encountered in the making of capsule bodies containing a liquid filler content formed of substances which are highly mobile, volatile or inflammable. The practice in the past has been to fill the capsule bodies with material of this kind in a liquid condition. Certain of these medicinal substances volatilized at low temperatures and considerable loss of the substance was encountered in the filling operation causing a variation in the dosages injected in the capsule shell. For those capsulating substances which are highly inflammable such as carbon disulphide there was always the ever present danger of fire.

The present invention provides a novel method of manufacturing capsules containing substances of high mobile, inflammable or volatile qualities and eliminates or reduces the disadvantages encountered in the prior practice of manufacturing such capsules. As will be more fully described hereinafter, the process comprises the novel steps of first forming the highly mobile, inflammable or volatile capsulating compound into a partially solidified form or viscous gel, and then while in this state enclosing the same within a shell such as that formed of gelatin. Formed in this manner the filler content of the capsules will be considerably more stable and will not spread or volatize during the capsulating process to any appreciable extent. As a result, accurate and uniform dosages of the material can be capsulated without loss due to vaporization or spreading of the material and without danger of fire.

Another important object and feature of this invention is the discovery that a relatively small proportion of certain neutral agents will in a simple inexpensive procedure solidify liquid capsulating material having the dangers or undesired characteristics referred to above and as a result improve the capsulating operation and the product derived thereby. One such form of an agent falls within the class of soaps and is preferably a water insoluble metal soap. These agents are mechanically mixed with the highly volatile, inflammable or mobile liquid ingredients in the capsulating material and when the mixture is heated to certain prescribed temperatures, preferably under pressure, will, after agitation, cause the mixture to form into a viscous gel. In this state it is easily controlled and introduced into the shell bodies, and the losses heretofore experienced by vaporization or by the spread of the capsulating material is greatly if not entirely eliminated.

Another object of this invention is to provide a novel capsule body and particularly a new form of filler content therefor which is more efficient in internal use. The filler content is as previously described in the form of a viscous gel and when it is introduced into the stomachs of animals or persons it will remain longer in such places than a liquid filler content and for this reason is highly desirable as a vermifuge and expeller of foreign substances in the stomach and alimentary tract.

Another distinguishing feature of the invention is the use of an agent in the capsulated material which as the filler content liquefies in the intestinal tract, will cause it to quickly spread in all directions and penetrate into all crevices and depressions in the surrounding surfaces. The new agent accomplishing this desirable result is a wetting agent, so called because of its spreading ability. When mixed in the capsulating material it renders this material highly efficacious particularly as a vermifuge in the stomachs and the alimentary tracts of animals.

More particularly the invention comprehends a capsule product especially desirable for the use in the stomachs of animals to remove undesirable growths therein such as that formed by the botts disease, and a novel process of making the same which reduces the losses, damages and hazards heretofore encountered.

For the cure of diseases in the stomachs and the alimentary tracts of animals, such as the botts disease, strong oil solvents such as carbon disulphide, carbon tetrachloride and tetrachloethylene have been used. These subsances are highly mobile and volatilize at relatively low temperatures. In addition, carbon disulphide is highly inflammable and therefore dangerous to use. The present invention eliminates or reduces the difficulties heretofore encountered in the capsulating of these substances.

It was found that by the use of certain stiffening agents of neutral behavior that it was possible to change the liquid character of the above oil solvents into a partially solidified form in the nature of a viscous gel which improved the process of manufacture in the manner above described. One form which has been found highly desirable is in the class of soap-forming ingredients. It is water insoluble metal soap such as, for example, an aluminum stearate compound. Although any one of the three subsidiary forms of this compound, aluminum mono-stearate, aluminum di-stearate, and aluminum tri-stearate, may be used, the di-stearate form has been found the most desirable for this purpose. Other compounds of this class such as calcium and magnesium stearate may be used.

Other aluminum compounds are satisfactory agents for the gel formation in carbon disulphide, carbon tetrachloride and tetrachlorethylene solutions. Aluminum mono, di and tri palmatate and aluminum mono, di and tri oleate are satisfactory agents for this purpose, although one will vary from the other in effectiveness depending on the particular fatty acid represented as an aluminum salt. Other alkaline earth metals in combination with the soap radical may be used if desired. In place of the stearate radical the oleates of aluminum or iron may be used. The oleate compounds however form a softer gel.

To change the oil solvents above described to the desired viscous state, it was found that only a relatively small proportion of the stiffening agent, such as aluminum stearate was necessary. From 1% to 10% approximately of such an agent would be sufficient. When these proportions of aluminum stearate are added to carbon disulphide, tetrachlorethylene or carbon ingredients, and the resulting mixture agitated in a closed vessel for a period of time at temperature conditions approaching but less than the temperature at which the solvent boils at atmospheric pressure the mixture eventually change to a very definite thickness or gel-like condition. It is desirable to agitate or stir the mixture for about fifteen to thirty minutes at the temperature condition set forth above. Thus the addition of from one to ten percent of aluminum stearate to any one of these solvents, followed by a rise in temperature to 40-45° C. in the case of carbon disulfide and 50-55° C. in the case of tetrachlorethylene and carbon tetrachloride, and maintenance of this temperature from 15 to 30 minutes in all cases, will result first in the dissolving of the aluminum stearate into the solvent, followed by a very definite thickening of the mobile solvent. The degree of thickening is proportionate to the amount of the stiffening agent used.

Various compositions may be formed in this manner, those given below being merely illustrative of the invention:

1. (a) Paraffin _____ grams__ 50
      Mineral oil _____ do____ 50
      Aluminum stearate_____ do____ 6
   (b) Carbon disulfide_____ do____ 106

The mixture in (a) is heated until solution results. It is then mixed with (b) in an agitating apparatus at the temperature range and for the length of time specified above.

Other mixtures in which carbon disulfide is used are as follows:

2. (a) Paraffin _____ grams__ 50
      Mineral oil _____ do____ 50
      Aluminum stearate _____ do____ 12
   (b) Carbon disulfide_____ do____ 112
3. (a) Paraffin _____ do____ 30
      Mineral oil 200 W _____ do____ 20
      Aluminum stearate _____ do____ 10
   (b) Carbon disulfide_____ cc____ 138
4. Aluminum stearate_____ grams__ 2
   Carbon disulfide_____ do____ 127

This last formula is preferably warmed on a steam bath in a closed container until the gel is formed and the aluminum stearate is in complete solution. It has been found that the preparations numbered one to three inclusive reduce the loss of carbon disulfide due to evaporation in an open container to about 50% as compared with the amount lost when straight carbon disulfide is used over the same period of time.

Desirable capsulating preparations containing tetrachlorethylene and carbon tetrachloride and the stiffening agent are:

5. Tetrachlorethylene _____ grams__ 98
   Aluminum stearate_____ do____ 2
6. Carbon tetrachloride_____ do____ 98
   Aluminum stearate_____ do____ 2

As previously described, it has been found that the use of certain wetting agents increase the efficiency of such preparations. This is particularly true in connection with capsulated preparations for removing botts which infest the stomachs of horses, cattle, etc. The increased efficiency is probably due to the fact that the wetting agent allows the remedial agent carbon disulfide, carbon tetrachloride, etc. to come into close contact with the bott organism and produce death in a shorter time. Typical examples of wetting agents capable of use are: "Albasol A. R.," a liquid soap sold by the National Oil Products Company, and "Aerosol O. T." (dioctyl ester of sodium sulfosuccinic acid). Typical formulas employing these two agents are as follows:

```
                                           Grams
7. Carbon disulfide_____ 95.5
   Aerosol O. T._____ 0.5
   Aluminum stearate_____ 4
8. Carbon disulfide_____ 93
   Albasol A. R._____ 3
   Aluminum stearate_____ 4
9. Carbon disulfide_____ 94
   Albasol A. R._____ 1.5
   Aerosol O. T._____ 0.5
   Aluminum stearate_____ 4
```

The quantity of the wetting agent used is not necessarily fixed but may be used within a fairly large range to thus vary the action of the preparation on the disease organism.

What I claim:

1. A medicinal composition for internal administration consisting of a volatile liquid anthelmintic having a water insoluble metal soap mixed therewith in sufficient quantity to render the composition of gel-like consistency.

2. The composition defined in claim 1 wherein the anthelmintic is carbon tetrachloride.

3. The composition defined in claim 1 wherein the anthelmintic is tetrachlorethylene.

4. The composition defined in claim 1 wherein the anthelmintic is carbon disulfide.

5. The composition defined in claim 1 wherein the anthelmintic is carbon disulfide and the metal soap is aluminum stearate.

6. A medicinal product consisting of a water soluble capsule shell filled with a composition consisting of a volatile liquid anthelmintic having a water insoluble metal soap mixed therewith in sufficient quantity to render the composition of gel-like consistency.

ROBERT P. SCHERER.